Nov. 23, 1926.
E. J. VON HENKE
ELECTRODE
Filed Feb. 28, 1923
1,607,710
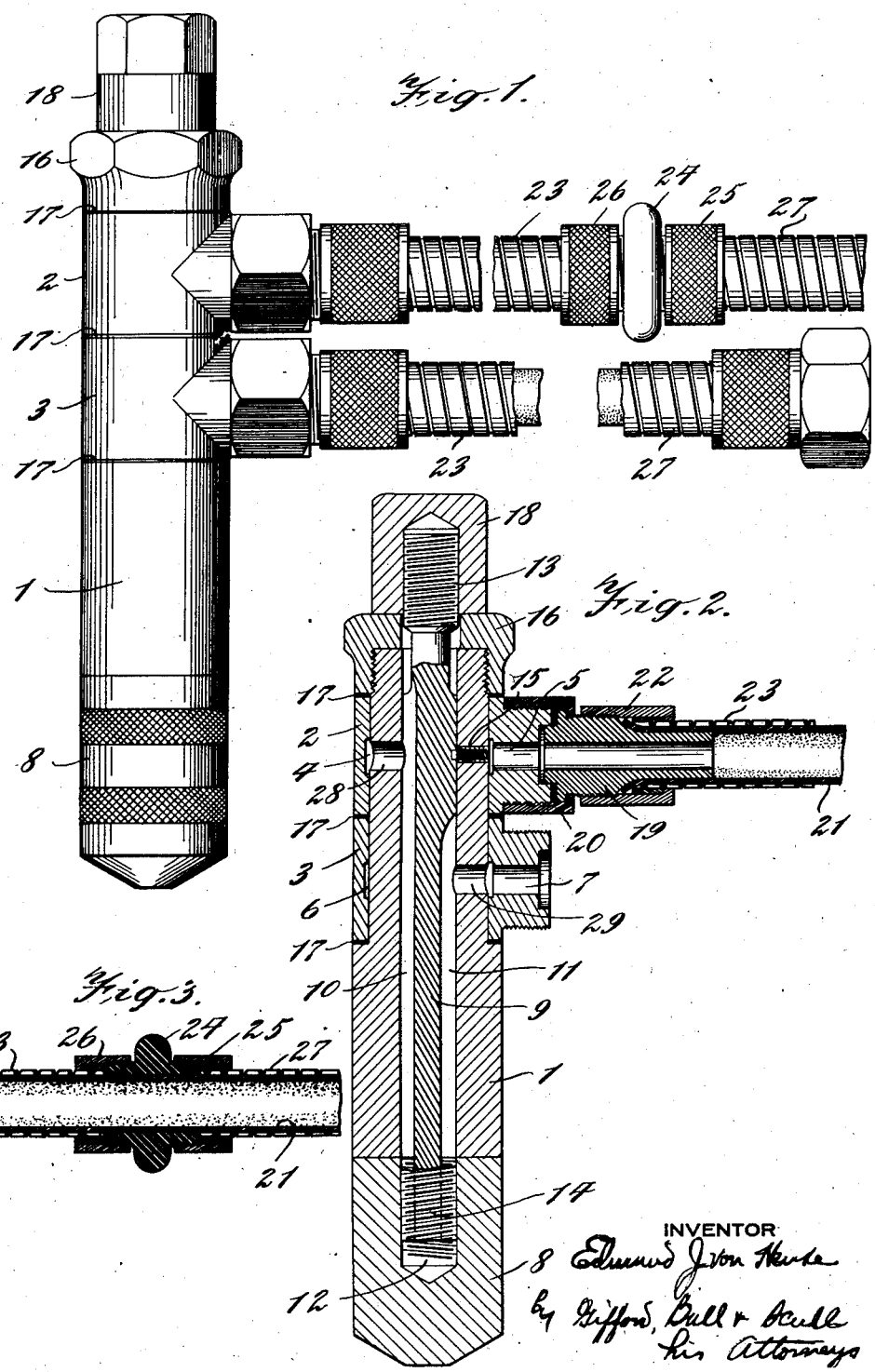

Patented Nov. 23, 1926.

1,607,710

UNITED STATES PATENT OFFICE.

EDMUND J. VON HENKE, OF CHICAGO, ILLINOIS.

ELECTRODE.

Application filed February 28, 1923. Serial No. 621,697.

My invention relates to electrodes and particularly to water cooled electrodes for electric spot welding machines.

As heretofore constructed such electrodes were inefficient and difficult to operate, but I have devised such an electrode which is efficient, easily operated and in which the water supply and discharge conduits are covered with a flexible metal armor and at the same time the electrode is isulated from the machine.

My invention will better be understood from the following description taken in connection with the accompanying drawings, showing one embodiment of my invention and in which:

Figure 1 shows a side elevation of an electrode embodying my invention; Fig. 2 shows a vertical central section of the device shown in Figure 1; and Figure 3 is a detailed sectional view of an insulating coupling.

Referring to the drawings the electrode comprises a body member 1 which is reduced at its upper end and around which reduced portion are placed two sleeves 2 and 3. The sleeve 2 is provided with a peripheral passage 4, which communicates with an inlet passage 5. The sleeve 3 is provided with a peripheral passage 6 which communicates with an outlet passage 7.

The body member 1 is provided with an interior chamber which extends from the upper end of the electrode, through the body member and into the tip 8, which is attached to the body member 1. Placed in the chamber is a removable partition or tie member 9 which divides the chamber into two legs 10 and 11, which communicate through the passage 12 in the tip. The partition 9 is in the form of a rod with channels, cut on its sides and is provided at its upper end with a screw threaded portion 13 and at its lower end with a screw threaded portion 14. The partition is placed in the chamber and a screw 15 is screwed into place and locks the partition in place in the chamber. The upper end of the body member 1 is screw threaded and an open ended nut 16 is screwed thereon. This nut holds the sleeves 2 and 3 in place. Washers 17 are placed between the nut 16 and sleeve 2, between sleeves 2 and 3 and between sleeve 3 and a shoulder on the body member 1. The member 18 is screwed onto the screw threaded portion 13 of the partition 9 and the tip 8 is screwed onto the screw threaded portion 14 of the partition 9.

A nipple 19 is attached to a boss on the sleeve 2, by a flanged nut 20. A flexible rubber hose 21 is fastened on the nipple 19 by a flanged nut 22. The nut 22 also acts to fasten a flexible metallic armor 23 to the nipple 19. A similar arrangement is provided for attaching a hose to a boss on the sleeve 3.

At some suitable point in the armor 23 is placed an insulated coupling of the form shown in Fig. 3. This coupling comprises a member 24 of insulating material to the sides of which are screwed flanged nuts 25 and 26 which hold the flexible armor members 23 and 27 in place. It will be noted that the rubber hose 21 is continuous and therefore forms a continuous water tight passage thus avoiding the possibility of leaks. The hose is made of insulating material.

In use, the electrode described is efficient and easily operated, because the sleeves 2 and 3 are movable around the body member 1 and the connections for the circulating liquid are maintained in every position of the sleeves, because of the peripheral passages which communicate with the inlet and outlet, respectively, and with the cooling chamber inside the member 1 throughout substantially the entire length of the electrode including the major portion of the tip 8, thus acting to effciently cool the same and prolong the life thereof.

While I have shown and described one embodiment of my invention, I desire it to be understood that I am not limited to the particular arrangement shown, since many changes may be made in the details thereof, without departing from the spirit of my invention.

I claim:—

1. A water cooled electrode comprising a body member, a chamber therein, a removable partition therein extending substantially throughout the length of the chamber, but leaving the parts in communication, two sleeves around said body member, one of said sleeves having a water inlet passage and the other a water outlet passage, a peripheral passage connecting said inlet passage with one end of said chamber and a peripheral passage connecting the outlet passage with the other end of said chamber.

2. A water cooled electrode comprising a body member, a tie member extending through said body member, a tip attached to said tie member, a head for said body member and means for supplying cooling fluid fastened to said body member and movable therearound.

3. A water cooled electrode comprising a body member, two sleeves surrounding said member and movable therearound, a nut screwed onto said member for holding said sleeves in place, a tie member passing through said body member and a head attached to one end of said tie member and a tip attached to the other end thereof, said electrode having a passage therethrough for the circulating fluid.

4. A water cooled electrode comprising a body portion with a circulating passage therethrough, two sleeves surrounding said body portion and having circulating passages therethrough, flexible hose attached to said sleeves, a metallic armor for said hose and an insulating coupling for said armor between the electrode and welding machine.

5. A water cooled electrode comprising a body member, a member extending through said body member to provide longitudinal channels for the cooling medium, a tip for said electrode and means rotatable about the axis of the body member for supplying cooling fluid to said tip through said channel.

EDMUND J. von HENKE.